United States Patent Office.

HEINRICH TRENK, OF BERLIN, GERMANY, ASSIGNOR TO HIMSELF, JEAN BALLATSCHANO, AND CONSTANTIN BALLATSCHANO, OF BUCHAREST, ROUMANIA.

COMPOSITION FOR TANNING HIDES AND SKINS.

SPECIFICATION forming part of Letters Patent No. 236,280, dated January 4, 1881.

Application filed May 1, 1880. (No specimens.)

*To all whom it may concern:*

Be it known that I, HEINRICH TRENK, of Berlin, Prussia, German Empire, have invented a new and useful Composition for Tanning Hides and Skins, of which the following is a specification.

The object of my invention is to provide a new and useful tanning compound, whereby the hides are tanned much more rapidly and the leather possesses a greater density than heretofore.

In carrying out my invention, the hair is first removed from the skins in any well-known way, and the hides then treated with a mixture of the two following solutions: first, a solution of chromate of alumina in strongly-diluted pyroligneous acid, in the proportion of twenty-five parts of each to one thousand parts of water; second, a concentrated solution of crude tartar or argol, to which a small quantity of some salt, such as chloride of zinc, muriate of ammonia, chloride of calcium, or analogous salt, is added. I employ one thousand parts of the tartar solution and fifteen parts of the salt. Two parts of the first solution and one part of the second are then mixed together.

This mixture is strong enough to tan horse-skins perfectly in from ten to fourteen days, and if the temperature of the liquid is maintained at about 71° to 81° Fahrenheit the rapidity of the action will be augmented. The addition of a small quantity of carbolic acid also improves the action of the liquid. After this treatment the skins are carefully washed and dried in the usual manner.

What I claim as new and of my invention is—

A tanning composition consisting of two solutions mixed in the proportion of two to one, the first formed of twenty-five parts of pyroligneous acid and the same of chromate of alumina in one thousand parts of water, and the second formed of a concentrated solution of crude tartar and a small quantity of chloride of zinc or analogous salt, as set forth.

The above specification of my invention signed by me this 25th day of March, 1880.

HEINRICH TRENK.

Witnesses:
 FRANZ SCHULTZE,
 BERTHOLD ROI.